United States Patent [19]
Pereira et al.

[11] Patent Number: 5,850,845
[45] Date of Patent: Dec. 22, 1998

[54] BACKFLUSH VALVE FOR MILKING MACHINE SYSTEM

[75] Inventors: Lawrence Pereira; Richard Daniel Pereira, both of Turlock, Calif.

[73] Assignee: Pereira Construction, Inc., Hilmar, Calif.

[21] Appl. No.: 733,359

[22] Filed: Oct. 17, 1996

[51] Int. Cl.⁶ ................................. A01J 7/00; B08B 9/02
[52] U.S. Cl. ................ 157/259; 119/114.18; 134/166 C; 137/240; 251/329; 222/148
[58] Field of Search .................... 134/166 C; 137/239, 137/240, 241; 119/14.01, 14.02, 14.08, 14.1, 14.18; 251/326, 327, 329; 222/148

[56] References Cited

U.S. PATENT DOCUMENTS

| | | | |
|---|---|---|---|
| 2,630,293 | 3/1953 | Smith | 137/240 |
| 2,764,995 | 10/1956 | Krupp et al. | 137/241 |
| 2,779,308 | 1/1957 | Gallistel | 119/14.18 |
| 3,044,443 | 7/1962 | Baum | 119/14.06 |
| 4,034,713 | 7/1977 | Umbaugh | 119/14.18 |
| 4,034,714 | 7/1977 | Umbaugh et al. | 119/14.18 |
| 4,149,489 | 4/1979 | Umbaugh et al. | 119/14.18 |
| 4,168,677 | 9/1979 | Brown | 119/14.18 |
| 4,174,728 | 11/1979 | Usnick et al. | 137/240 |
| 4,222,346 | 9/1980 | Reisgies | 119/14.18 |
| 4,292,992 | 10/1981 | Bhidé | 137/240 |
| 4,383,546 | 5/1983 | Walters, Jr. | 137/240 |
| 4,498,419 | 2/1985 | Flocchini | 119/14.18 |
| 4,572,105 | 2/1986 | Chowdhury et al. | 119/14.18 |
| 4,909,272 | 3/1990 | Carpentier | 137/240 |
| 5,492,090 | 2/1996 | Bücker | 119/14.01 |

OTHER PUBLICATIONS

CIP Backflush Valve parts description, pp. 99–101, Oct. 1994.

*Primary Examiner*—George L. Walton
*Attorney, Agent, or Firm*—Townsend and Townsend and Crew LLP

[57] ABSTRACT

An improved milking machine backflush valve (2) includes inlet and outlet plates (18, 20) between which a slide pad (16) is slidably housed. The inlet plate has a milk inlet (24) and the outlet plate has a milk outlet (28). The slide pad couples the milk inlet to the milk outlet when in a milking position, and couples the milk inlet to a source of cleaning solution (22) when in a backflush position. The slide pad and inlet and outlet plates have smooth, contacting sliding surfaces (34, 36; 66, 68) and are made of a non-liquid absorbing material, preferably PTFE, so that no seals, which can wear and harbor milk residue and thus bacteria, need be used.

29 Claims, 3 Drawing Sheets

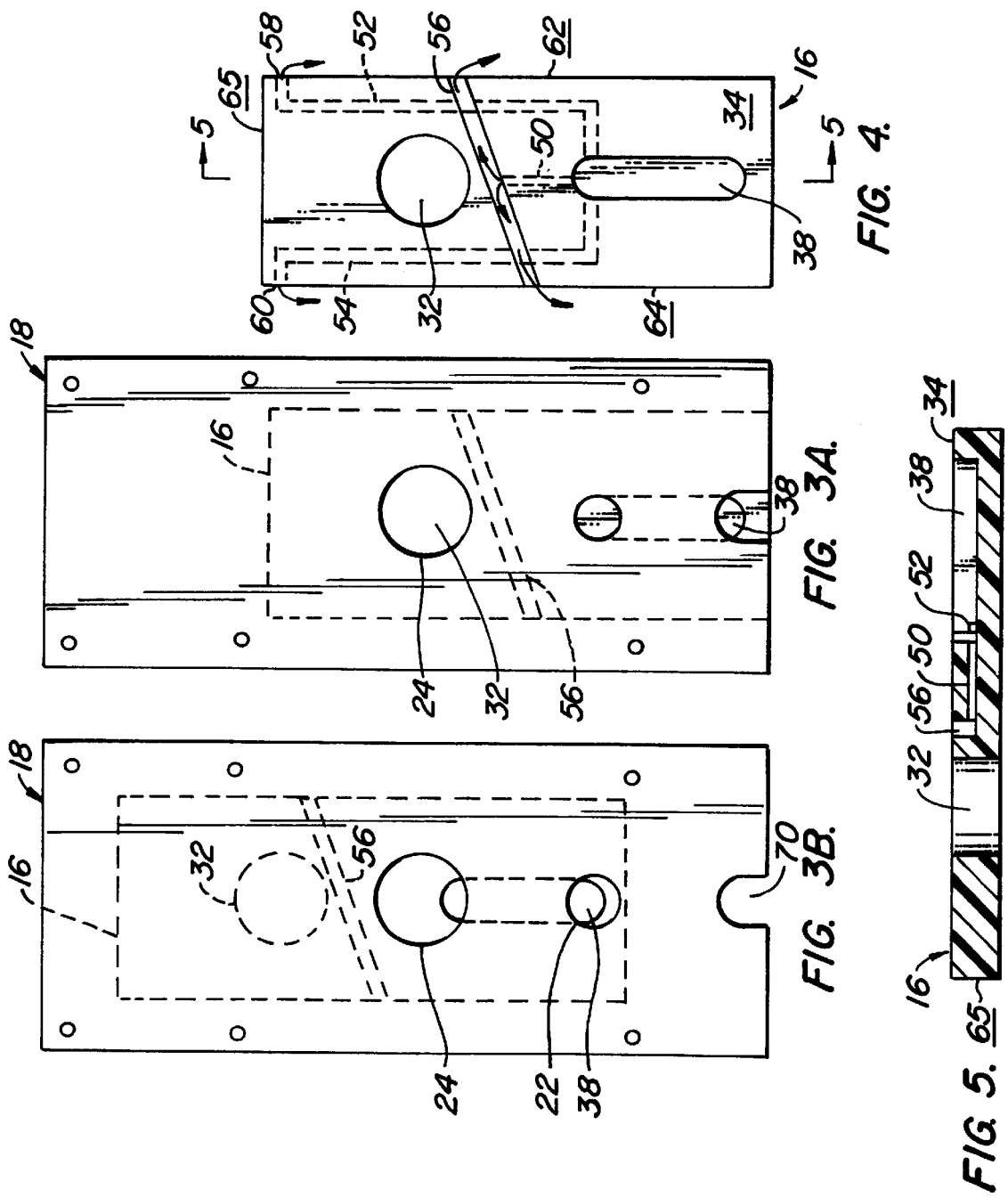

5,850,845

BACKFLUSH VALVE FOR MILKING MACHINE SYSTEM

BACKGROUND OF THE INVENTION

Modern dairy farms use automatic milking machines. After each cow has been milked, the teat cups must be sanitized to prevent the spread of bacteria. To facilitate this, a backflush valve is mounted along the milk line. After milking is finished, the teat cups are removed and the backflush valve is actuated so a water/iodine solution, or other cleaning solution, is passed through the valve and back up the milk hose to the teat cups to flush out any residual milk and sanitize the system upstream of the backflush valve.

Known backflush valves are typically high maintenance, difficult to work with and, most importantly, often trap bacteria. One conventional backflush valve uses an air cylinder to move a rubber pad between two flat plates. Doing so causes an opening in the rubber pad to either align with the milk inlet or the backflush solution inlet. During milking operations the opening in the pad is aligned with the milk inlet so the milk flows through the backflush valve and out through the milk outlet. After milking has ceased, the air cylinder is actuated to move the rubber pad so that the opening in the rubber pad is aligned with the backflush solution inlet. When this occurs, the backflush solution is passed through the backflush solution inlet and is then directed to the milk inlet by a pathway formed by the rubber pad. This design has several problems. First, milk residue can be absorbed by the rubber pad or trapped between the rubber pad and adjacent flat plates, in either event permitting the growth of bacteria. Also, milk residue may accumulate along the edges of the rubber pad which creates a relatively unsanitary condition. These problems require that this type of valve undergo frequent periodic maintenance and replacement of the rubber pad. Other designs use O-ring seals which have their own set of problems, including wear and trapping of milk residue permitting the growth of bacteria.

SUMMARY OF THE INVENTION

The present invention is directed to an improved backflush valve of the type including a slide pad captured between a pair of plates. The slide pad and plates have smooth, contacting sliding surfaces constructed of materials which are extremely smooth and which preferably are non-liquid-absorbing, relatively inert materials. The contacting sliding surfaces are biased towards one another to form a seal. This eliminates the need for separate sealing structures, such as O-rings, and also eliminates the need to sanitize and replace moisture-absorbing slide pads, such as those made of rubber.

The inlet plate has a milk inlet and a cleaning solution inlet and the outlet plate has a milk outlet. The slide pad defines a milk path, which couples the milk inlet to the milk outlet when the slide pad is in a milking position, and a cleaning solution path which couples the milk inlet to a cleaning solution inlet when the slide pad is in a backflush position. Between the smoothness and the non-absorptive character of the surfaces, no seals, which can wear and can harbor milk residue and thus bacteria, need be used.

The slide pad is preferably captured between the inlet and outlet plates through the use of spring-biased clamping elements to provide adjustable, steady surface pressure between the opposed surfaces. The slide pads and the inlet and outlet plates are preferably sized so that regardless of the position of the slide pad between the plates, the slide pad remains at least substantially completely captured between the plates so to minimize the exposure the sliding surfaces of the slide pad to the environment.

Supplemental passageways can be used within the body of the slide pad to permit cleaning solution to pass down the exposed sides of the slide pad to therefore flush away any accumulated dirt and milk residue on the exposed sides during backflushing operations. In addition, an air gap can be formed on one surface of the slide pad between the cleaning solution path in the one surface of the slide pad and the milk path formed through the slide pad. This air gap provides an additional barrier to the migration of cleaning solution along the interface of abutting sliding surfaces the slide pad and inlet plate and into the milk path.

For the present invention to be effective, the abutting sliding surfaces of the inlet and outlet plates and the slide pad must be very smooth and in intimate contact so that they act as sealing surfaces. While the sliding surfaces could be curved, they are preferably flat. One aspect of the invention is the recognition that it would be necessary to make the surface extremely flat and smooth to obtain the desired sealing effectiveness without the need for separate seals or rubber slide pads. When the slide pad is made of PTFE, the sliding surfaces are made flat and smooth by a series of machining operations in which the PTFE stock is baked and then trimmed, baked and then trimmed, typically three or more times, until the PTFE stock stops changing shape after each trimming operation. Once the PTFE stock is stabilized, a final trim is performed and the surfaces are polished to an extremely smooth surface. Likewise, the sliding surfaces of the inlet and outlet plates, typically made of stainless steel, are lapped and polished to a very smooth and flat state. This attention to detail, by providing extremely flat and smooth sliding surfaces, eliminates contamination migration between the contacting sliding surfaces of the slide pad and the inlet and outlet plates.

Other features and advantages of the invention will appear from the following description which the preferred embodiment has set forth in detail in conjunction with the accompanying drawings.

BRIEF DESCRIPTION OF THE DRAWINGS

FIGS. 3A and 3B are simplified front elevational views of the entrance plate of FIG. 1 showing the slide pad in dashed lines in milking and backflush positions, respectively;

FIG. 4 is an enlarged front elevational view of the slide pad of FIG. 2 showing supplemental passageways extending from the cleaning solution path in dashed lines; and FIG. 5 is a cross-sectional view taken along line 5—5 of FIG. 4.

DESCRIPTION OF THE PREFERRED EMBODIMENT

Figure 1:
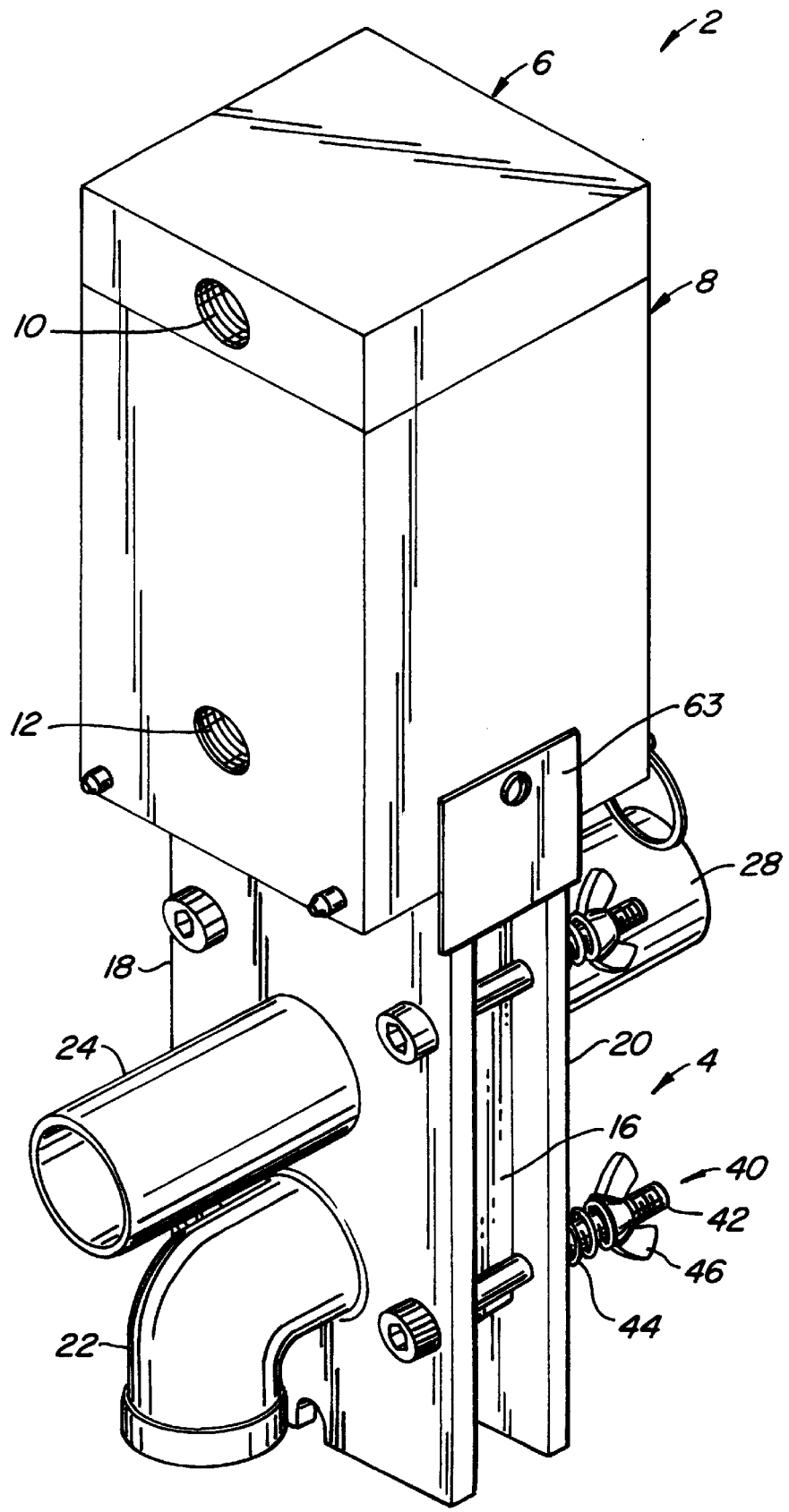
FIG. 1 is an overall isometric view showing a backflush valve mode according to the invention.
Figure 2:
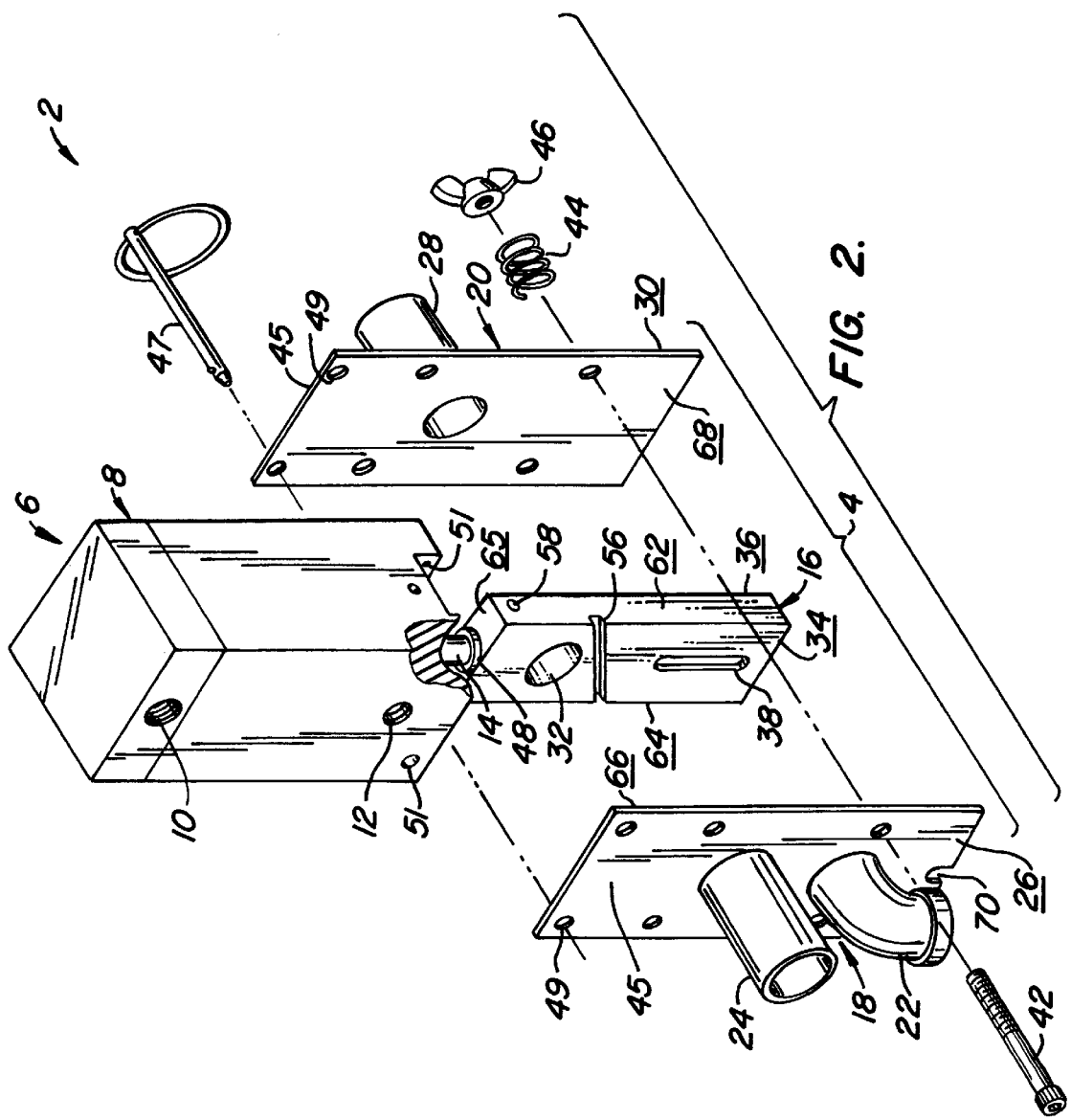
FIG. 2 is a partially exploded isometric view of the backflush valve of FIG. 1.

FIGS. 1 and 2 illustrate a backflush valve 2 of the type used with a conventional milking machine system. Backflush valve 2 comprises broadly a body 4 and a pneumatic slide driver 6. Slide driver 6 comprises a body 8 having a pair of air ports 10, 12. Air ports 10, 12 are selectively coupled to a source of compressed air, not shown, to reciprocate a double acting piston housed within the body between two extremes. The piston, not shown, drives a rod 14 for the purposes to be discussed below.

Body 4 includes broadly a slide pad 16 made of a block of PTFE captured between an inlet plate 18 and an outlet plate 20. Inlet plate 18 has a cleaning solution inlet 22 and a milk inlet 24 extending from its outer surface 26. Outlet plate 20 has a milk outlet 28 extending from its outer surface 30. Backflush valve 2 is placed along the milking line with milk inlet 24 coupled to the teat cups, not shown, and milk outlet 28 coupled to the pipeline (not shown). Cleaning solution inlet 22 is coupled to a source of cleaning solution, not shown, as is conventional.

Slide pad 16 has a milk bore 32 passing completely through the slide pad extending from surfaces 34, 36 of the slide pad. Slide pad 16 also includes a cleaning solution path 38 formed about half way through slide pad 16 into surface 34.

Slide pad 16 is captured between plates 18, 20 using a set of four spring clamps 40. Each spring clamp 40 includes a bolt 42, a coiled compression spring 44, and a wing nut 46. Using four, hand-tightened spring clamps 40 provides a great amount of flexibility in using an appropriate amount of clamping force on slide pad 16. The upper ends 45 of plates 18, 20, with slide pad 16 therebetween, are secured to body 8 of slide driver 6 by a pair of quick removal pins 47 passing through holes 49 formed in plates 18, 20 and holes 51 formed in body 8. Lower end 48 of rod 14 is pinned or otherwise secured to slide pad 16. Slide pad 16 is moved between plates 18, 20 by the axial movement of rod 14.

Applying pressurized air to air port 10 causes rod 14 to extend from body 8 thus moving slide pad 16 into the milking position of FIG. 3A. At this position milk bore 32 is aligned with milk inlet 24 and milk outlet 28. When air port 12 is pressurized, rod 14 is withdrawn back into body 8 of slide driver 6 thus moving slide pad 16 to the backflush position of FIG. 3B. At this position milking outlet 28 is fluidly disconnected from milking inlet 24 while cleaning solution inlet 22 is fluidly coupled to milking inlet 24 by path 38. At this position a cleaning solution, typically water and iodine, flows into cleaning solution inlet 22, along path 38, out milk inlet 24 for flow back through the teat cups of the milking machine. In addition, cleaning solution passes along supplemental passageways 50, 52, 54 shown in FIG. 4.

Supplemental passageway 50 fluidly couples cleaning solution path 38 to a lateral air gap 56 formed in surface 34. During backwashing operations the provision of supplemental passageway 50 helps to insure that air gap 56 is cleaned or flushed, primarily of any milk residue. Passageways 52, 54 allow cleaning solution to pass out of holes 58, 60 formed in the sides 62, 64 of slide pad 16. This allows the cleaning liquid to flow down and flush the sides 62, 64 of slide pad 16 during backflushing to help rid backflush valve 2 of milk residue and other contaminants. Splashplates 63, shown in FIG. 1 only, can be mounted to body 8 of slide driver 6 to deflect cleaning liquid that has been forced through holes 58, 60 during backwashing. If desired, additional supplemental passageways can be formed within slide pad 16 to allow cleaning fluid to be dispensed to other surfaces, such as top surface 65.

Surfaces 34 and 36 of slide pad 16 and the opposed sliding surfaces 66, 68 of inlet and outlet plates 18, 20 are manufactured to be extremely smooth and flat. This eliminates the need for using seals surrounding the various apertures, such as O-ring seals, which must be cleaned and replaced because they are very good traps for milk residue and thus good sites for bacteria growth. Slide pad 16 is made of a material which does not absorb liquid and is substantially inert, such as PTFE. Thus, essentially the entire backflush valve 2 is made of stainless steel with the exception of slide pad 16 which is made of PTFE. PTFE works well because it is lubricious, does not absorb liquids, and is substantially inert. It is also important to insure that leakage does not occur between surfaces 34, 66, during backflushing operations because such leakage could, after returning the valve to milking position of FIG. 3A, contaminate the subsequently obtained milk with the cleaning solution and whatever was drawn with it.

It has been found by making surfaces 34, 66 very flat and smooth an effective seal can be created using spring clamps 40 tightened to a force of about 16 lbs. to 33 lbs. surface force to create a surface pressure of between about 14 psi to 29 psi. In addition, surface 66 is smoothed to a surface roughness no greater than 16 RMS and a flatness no greater than about 0.0005" over its length. This is commonly achieved by conventional machining operations such as grinding, lapping, and polishing. Surface 68 is likewise treated to those same surface treatments.

One of the problems with machining PTFE is that after machined, the block of PTFE material tends to change dimensions. Because of this, surfaces 34, 36 achieve the desirable surface roughness of no greater than about 16 RMS and flatness of no greater than about 0.0005" over its length using a somewhat specialized technique. The PTFE stock is baked at about 400° F. for four hours and then trimmed, typically by milling. This procedure of baking and trimming is duplicated three or more times. Once the PTFE stock is stabilized, a final trim is performed by milling and the surface is polished by lapping to achieve the desired smooth and flat surface.

Air gap 56 is used to provide an additional level of assurance that cleaning liquid does not enter milk bore 32 during backflush operations. In the unlikely event that backflush liquid migrates between surfaces 34, 66 from path 38 towards milk bore 32, air gap 56 intercepts such fluid migration and causes such liquid to flow out through the lower end of the air gap.

In use, backflush valve 2 is coupled along a milking line with milk inlet 24 coupled to the teat cups, milk outlet 28 coupled to the pipeline and cleaning solution inlet 22 coupled to a source of cleaning solution for backflushing. Air is supplied to air port 10 to align milk bore 32 with inlet 24 and outlet 28 is shown in the milking position of FIG. 3A. At the termination of milking, once the teat cups are removed, backflushing can be accomplished. To do so, air port 12 is pressurized which drives slide pad 16 to the backflush position of FIG. 3B so that a cleaning solution can be passed through inlet 22, along path 38, and back up the milking line to the teat cups to milk inlet 24. During this time cleaning solution also passes through supplemental passageways 50, 52 and 54 to flush air gap 56 and flush down sides 62, 64 of slide pad 16. Once backflushing has been completed, air is again introduced through air port 10 driving slide pad 16 to the milking position of FIG. 3A so that the bottom end of cleaning solution path 38 is aligned with a cut out 70 formed in the bottom end of inlet plate 18. Cut out 70 permits cleaning solution to drain from cleaning solution path 38 to help prevent cross-contamination which may otherwise occur.

Backflush valve 2 is simply disassembled for cleaning. First, the user loosens nuts 46, removes pull pins 47 and then pulls slide pad 16 from between plates 18, 20. To separate plates 18, 20, the user merely removes wing nuts 46 which permits the removal of bolts 42 as suggested in FIG. 2. All components are then accessible for inspection and maintenance. Upon assembly, wing nuts 46 are tightened sufficiently to provide the desired amount of pressure between surfaces 34, 36 and surfaces 66, 68. It has been found that surfaces forces of about 14 psi to 29 psi have been successful when used with a slide driver having a 1.500" diameter piston and supplied with compressed air at 60 psi. It is important that a slide driver 6 can exert a force sufficient to overcome the friction which will necessarily be produced between the sliding surfaces. However, by making the sliding surfaces extremely smooth and flat, and using a lubricious surface for slide pad 16, the necessary driving force is reduced.

Modification and variation can be made to the disclosed embodiment without departing from the subject of the invention as defined by the following claims. For example, slide pad 16 could be made of a number of different materials, such as layered materials, instead of a single block of PTFE. Surfaces 66, 68 of plates 18, 20 could be made of a smooth, lubricious material instead of or in addition to surfaces 34, 36. Cleaning solution inlet 22 could be mounted to outlet plate 20 or to slide pad 16, instead of outlet plate 18. Slide driver 6 could be replaced by, for example, a solenoid actuated driver or a gear driven actuator.

What is claimed is:

1. An improved milking system backflush valve of the type comprising a body, a cleaning solution inlet carried by the body, the body comprising inlet and outlet plates and a slide pad mounted between the inlet plate and the outlet plate, the inlet plate having a milk inlet and the outlet plate having a milk outlet, the slide pad defining a fluid path, a slide driver operably coupled to the slide pad to selectively move the slide pad between a milking position, at which the slide pad fluid path fluidly couples the milk inlet to the milk outlet, and a backflush position, at which the outlet is blocked off and the slide pad fluid path fluidly couples the milk inlet to the cleaning solution inlet to backflush the milk inlet and upstream of the inlet to prevent contamination therein, the improvement comprising:

the slide pad and the inlet and outlet plates comprising contacting sliding surfaces, said sliding surfaces of said pad and said plates each having surface roughness of no more than about 16 RMS; and a clamping element biasing the plates against the pad with a desired force;

whereby the sliding surfaces and the desired force create a fluid seal between the slide pad and the plates.

2. The improved valve according to claim 1 wherein said slide pad and said inlet and outlet plates are sized so that said sliding surfaces of said pad remain substantially completely in contact with the sliding surfaces of said inlet and outlet plates when in the milking and backflush positions.

3. The improved valve according to claim 1 wherein said pad comprises supplemental passageways formed therein fluidly coupling the cleaning solution path to openings at a plurality of external surfaces of said pad thereby permitting a flow of cleaning solution to pass from the cleaning solution inlet, into the cleaning solution path, through the supplemental passageways and to said openings at said external surfaces.

4. The improved valve according to claim 1 wherein said slide pad fluid path comprises:

a cleaning solution path formed to fluidly couple the milk inlet to the cleaning solution outlet when the slide pad is in the backflush Position; and a milk path passing between said sliding surfaces of said slide pad to fluidly couple the milk inlet and outlet when the slide pad is in the milking position.

5. The improved valve according to claim 1 wherein said sliding surfaces of at least one of the slide pad and plates are made of a lubricious material.

6. The improved valve according to claim 1 wherein said slide pad is made of PTFE.

7. The improved valve according to claim 1 wherein said sliding surfaces of said slide pad and plates are flat and have flatness variations of less than about 0.0005" across said sliding surfaces.

8. The improved valve according to claim 1 wherein said desired force is about 14 to 29 pounds per square inch.

9. The improved valve according to claim 1 wherein said clamping element comprises a plurality of spring-biased clamps.

10. The improved valve according to claim 9 wherein each said spring-biased clamp comprises a threaded bolt passing through the plates, a nut threadably mounted to the bolt and a compression spring captured against one of the plates by a chosen one of said bolt and nut.

11. The improved valve according to claim 10 wherein the nut is a wing nut and the spring is captured between the wing nut and said one of the plates.

12. A milking system backflush valve comprising:

a body;

a cleaning solution inlet carried by the body;

the body comprising inlet and outlet plates and a slide pad mounted between the inlet plate and the outlet plate;

the inlet plate having a milk inlet and the outlet plate having a milk outlet;

the slide pad and the inlet and outlet plates comprising contacting sliding surfaces, said sliding surfaces of said pad and said plates each having surface roughness of no more than about 16 RMS;

the slide pad having first and second of said sliding surfaces;

said slide pad having a milk path, fluidly coupling the first and second surfaces, and a cleaning solution path formed therein;

a slide driver operably coupled to the slide pad to selectively move the slide pad between a milking position, at which the milk path fluidly couples the milk inlet to the milk outlet, and a backflush position, at which the outlet is blocked off and the cleaning solution path fluidly couples the milk inlet to the cleaning solution inlet to backflush the milk inlet and upstream of the inlet to prevent contamination therein;

a clamping element biasing the plates against the pad with a desired force;

whereby the sliding surfaces and the desired force create a fluid seal between the slide pad and the plates.

13. The improved valve according to claim 12 wherein said pad comprises supplemental passageways formed therein fluidly coupling the cleaning solution path to openings at a plurality of external surfaces of said pad thereby permitting a flow of cleaning solution to pass from the cleaning solution inlet, into the cleaning solution path, through the supplemental passageways and to said openings at said external surfaces.

14. The improved valve according to claim 12 wherein said slide pad comprises a lateral dimension and an air gap formed across the entire lateral dimension of said first sliding surface, said cleaning solution path being formed in said first sliding surface, said air gap positioned between the cleaning solution path and the milk path.

15. The improved valve according to claim 12 wherein said sliding surfaces are made of a non-liquid-absorbing material.

16. The improved valve according to claim 15 wherein said sliding surfaces of at least one of the slide pad and plates are made of a lubricious material.

17. The improved valve according to claim 12 wherein said sliding surfaces of said slide pad and plates are flat and have flatness variations of less than about 0.0005" across said sliding surfaces, and said desired force is about 14 to 29 pounds per square inch.

18. A slide pad, for use as a valve element of a milking machine backflush valve, comprising:
   a body having first and second sliding surfaces on opposite sides thereof;
   said body defining a milk path fluidly coupling said first and second sliding surfaces;
   said body defining a cleaning solution path formed in said first sliding surface; and
   said first and second sliding surfaces each having a surface roughness of no more than about 16 RMS.

19. The slide pad according to claim 18 wherein said body comprises supplemental passageways formed therein fluidly coupling the cleaning solution path to openings at a plurality of external surfaces of said body thereby permitting a flow of cleaning solution to pass from the cleaning solution inlet, into the cleaning solution path, through the supplemental passageways and to said openings at said external surfaces.

20. The slide pad according to claim 18 wherein at least said sliding surfaces of said body are made of a nonliquid absorbing material.

21. The slide pad according to claim 18 wherein said sliding surfaces are made of a lubricious material.

22. The slide pad according to claim 18 wherein said body is made of PTFE.

23. The slide pad according to claim 18 wherein said sliding surfaces of said slide pad and plates are flat and have flatness variations of less than about 0.0005" across said sliding surfaces.

24. An improved milking system backflush valve of the type comprising a body, a cleaning solution inlet carried by the body, the body comprising inlet and outlet plates and a slide pad mounted between the inlet plate and the outlet plate, the inlet plate having a milk inlet and the outlet plate having a milk outlet, the slide pad defining a fluid path, a slide driver operably coupled to the slide pad to selectively move the slide pad between a milking position, at which the slide pad fluid path fluidly couples the milk inlet to the milk outlet, and a backflush position, at which the outlet is blocked off and the slide pad fluid path fluidly couples the milk inlet to the cleaning solution inlet to backflush the milk inlet and upstream of the inlet to prevent contamination therein, the improvement comprising:
   the slide pad and the inlet and outlet plates comprising contacting smooth sliding surfaces;
   said slide pad fluid path comprising:
      a milk path extending between first and second of said sliding surfaces of said slide pad to fluidly couple the milk inlet and outlet when in the milking position; and
      a cleaning solution path formed in said first sliding surface of said slide pad to fluidly couple the milk inlet to the cleaning solution inlet when in the backflush position;
   the milk inlet and the cleaning solution inlet both opening onto said first sliding surface of said slide pad;
   said slide pad comprising lateral sides, a lateral dimension therebetween, and an air gap formed in said first sliding surface of said slide pad across the entire lateral dimension of said first sliding surface, said air gap positioned between the cleaning solution path and the milk path; and
   a clamping element biasing the plates against the pad with a desired force;
   whereby the sliding surfaces and the desired force create a fluid seal between the slide pad and the plates.

25. The improved valve according to claim 24 further comprising a supplemental passageway formed in said slide pad fluidly coupling said cleaning solution path and said air gap.

26. A milking system backflush valve comprising:
   a body;
   a cleaning solution inlet carried by the body;
   the body comprising inlet and outlet plates and a slide pad mounted between the inlet plate and the outlet plate;
   the inlet plate having a milk inlet and the outlet plate having a milk outlet;
   the slide pad and the inlet and outlet plates comprising contacting smooth sliding surfaces;
   the slide pad having first and second of said sliding surfaces;
   said slide pad defining a milk path, fluidly coupling the first and second surfaces, and a cleaning solution path formed in said first surface;
   said cleaning solution inlet and said milk inlet opening onto said first surface of said slide pad;
   a slide driver operably coupled to the slide pad to selectively move the slide pad between a milking position, at which the milk path fluidly couples the milk inlet to the milk outlet, and a backflush position, at which the outlet is blocked off and the cleaning solution path fluidly couples the milk inlet to the cleaning solution inlet to backflush the milk inlet and upstream of the inlet to prevent contamination therein;
   said slide pad comprising lateral sides, a lateral dimension therebetween, and an air gap formed in the first surface across the entire lateral dimension of said first surface, said air gap positioned between the cleaning solution path and the milk path; and
   a clamping element biasing the plates against the pad with a desired force;
   whereby the sliding surfaces and the desired force create a fluid seal between the slide pad and the plates.

27. The improved valve according to claim 26 further comprising a supplemental passageway formed in said slide pad fluidly coupling said cleaning solution path and said air gap so said air gap is purged and cleaning fluid can flow over the lateral sides during backflush of said milking machine backflush valve.

28. A slide pad, for use as a valve element of a milking machine backflush valve, comprising:
   a body having first and second smooth sliding surfaces on opposite sides thereof;
   said body defining a milk path fluidly coupling said first and second sliding surfaces;
   said body defining a cleaning solution path formed in said first sliding surface;
   said body comprising lateral sides and a lateral dimension therebetween; and
   an air gap formed in said first sliding surface across the entire lateral dimension of said first sliding surface, said air gap positioned between the cleaning solution path and the milk path.

29. The slide pad according to claim 28 further comprising a supplemental passageway formed in said body fluidly coupling said cleaning solution path and said air gap so said air gap is purged and cleaning fluid can flow over the lateral sides during backflush of said milking machine backflush valve.

* * * * *